US010298506B2

(12) United States Patent
McCormick et al.

(10) Patent No.: US 10,298,506 B2
(45) Date of Patent: May 21, 2019

(54) LOW JITTER TRAFFIC SCHEDULING ON A PACKET NETWORK

(71) Applicant: Huawei Technologies Co., Ltd., Shenzhen (CN)

(72) Inventors: William McCormick, Ottawa (CA); Tao Wan, Ottawa (CA); Yufei Wang, Holmdel, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 14/885,362

(22) Filed: Oct. 16, 2015

(65) Prior Publication Data

US 2016/0127250 A1  May 5, 2016

Related U.S. Application Data

(60) Provisional application No. 62/130,901, filed on Mar. 10, 2015, provisional application No. 62/073,132, filed on Oct. 31, 2014.

(51) Int. Cl.
*H04W 56/00* (2009.01)
*H04L 12/26* (2006.01)
(Continued)

(52) U.S. Cl.
CPC .......... *H04L 47/283* (2013.01); *H04L 43/062* (2013.01); *H04L 43/0852* (2013.01);
(Continued)

(58) Field of Classification Search
CPC ..... H04L 47/56; H04L 47/283; H04L 43/062; H04L 43/0852; H04W 56/00
See application file for complete search history.

(56) References Cited

U.S. PATENT DOCUMENTS

2004/0117753 A1* 6/2004 Kahng ................ G06F 17/5072
716/122
2007/0206604 A1* 9/2007 Best ...................... H04L 49/254
370/395.4
(Continued)

FOREIGN PATENT DOCUMENTS

CN   101237386 A   8/2008
CN   103179046 A   6/2013
(Continued)

OTHER PUBLICATIONS

Partial English Translation and Abstract of Chinese Patent Application No. CN101237386, Jun. 17, 2016, 5 pages.
(Continued)

*Primary Examiner* — Omer S Mian
(74) *Attorney, Agent, or Firm* — Slater Matsil, LLP

(57) ABSTRACT

A data traffic scheduling method that includes selecting, using a network controller, plurality of flows that traverses a network node, generating an augmented graph based on a flow rate of the plurality of flows and link capacities of the network node, computing a flow schedule for the flow using the augmented graph to minimize delay or delay variance of the flows, and outputting the flow schedule. A data traffic scheduling method that includes obtaining, using a network controller, a network topology for a network, generating an augmented graph based on the network topology, converting the augmented graph to a mixed-integer linear program, scheduling a flow in the network using the mixed-integer linear program to minimize delay or delay variance of the flow, and outputting a flow schedule.

21 Claims, 10 Drawing Sheets

(51) Int. Cl.
  *H04L 12/841* (2013.01)
  *H04L 12/875* (2013.01)
  *H04L 12/24* (2006.01)
  *H04L 12/707* (2013.01)
  *H04L 12/727* (2013.01)
  *H04L 12/751* (2013.01)

(52) U.S. Cl.
  CPC ............ *H04L 47/56* (2013.01); *H04W 56/00* (2013.01); *H04L 41/5019* (2013.01); *H04L 45/02* (2013.01); *H04L 45/121* (2013.01); *H04L 45/24* (2013.01)

(56) References Cited

U.S. PATENT DOCUMENTS

| | | | |
|---|---|---|---|
| 2008/0225774 A1* | 9/2008 | Kim | H04L 5/0037 370/315 |
| 2012/0155264 A1* | 6/2012 | Sharma | H04L 43/0852 370/232 |
| 2014/0149493 A1* | 5/2014 | Acer | H04W 4/003 709/203 |
| 2014/0169264 A1 | 6/2014 | Katori | |
| 2014/0269288 A1 | 9/2014 | Crisan et al. | |
| 2015/0370741 A1* | 12/2015 | Davies | G06F 15/17362 710/317 |

FOREIGN PATENT DOCUMENTS

| | | |
|---|---|---|
| CN | 103414650 A | 11/2013 |
| JP | 5212503 B2 | 6/2013 |
| WO | 2014037061 A1 | 3/2014 |

OTHER PUBLICATIONS

Partial English Translation and Abstract of Chinese Patent Application No. CN103179046, Jun. 17, 2016, 4 pages.

Foreign Communication From a Counterpart Application, PCT Application No. PCT/CN2015/093241, International Search Report dated Jun. 28, 2016, 7 pages.

Foreign Communication From a Counterpart Application, PCT Application No. PCT/CN2015/093241, Written Opinion dated Jun. 28, 2016, 4 pages.

Foreign Communication From a Counterpart Application, PCT Application No. PCT/CN2015/093500, International Search Report dated Feb. 3, 2016, 7 pages.

Foreign Communication From a Counterpart Application, PCT Application No. PCT/CN2015/093500, Written Opinion dated Feb. 3, 2016, 4 pages.

Dijkstra, "A Note on Two Problems in Connexion with Graphics," Numerishe Mathematik 1, pp. 269-271, 1959.

Skiena, "The Algorithm Design Manual," Second Edition, 2008, 739 pages.

Pioro, et al., "Networks with Shortest-Path Routing," Chapter 7, Routing, Flow, and Capacity Design in Communication and Computer Networks, The Morgan Kaufmann Series in Networking, pp. 253-306.

Pioro, et al., "Shortest-Path Algorithms," Routing, Flow, and Capacity Design in Communication and Computer Networks, The Morgan Kaufmann Series in Networking, pp. 639-652.

* cited by examiner

LOW JITTER TRAFFIC SCHEDULING ON A PACKET NETWORK

CROSS-REFERENCE TO RELATED APPLICATIONS

The present application claims benefit of U.S. Provisional Patent Application No. 62/130,901 filed Mar. 10, 2015 by William McCormick, et al., and entitled, "Optimization for Scheduling Low Traffic jitter on a Packet Network," and U.S. Provisional Patent Application No. 62/073,132 filed on Oct. 31, 2014 by Peter Ashwood-Smith, et al., and entitled, "Systems and Methods for CPRI Communication Over a Packet Switched Network," which are incorporated herein by reference as if reproduced in their entirety.

BACKGROUND

Common Public Radio Interface (CPRI) is an interface commonly deployed inside a base station. CPRI enables communication between the radio equipment and the radio equipment control. In some applications it is desirable to set up a CPRI over a delay sensitive network so that the radio equipment can remain at the remote site while the radio equipment control is located in a data center. Each CPRI flow is a constant bit rate flow with a constant source and destination. CPRI flows may be added or removed when a base station is added or removed. As such, they are relatively static and are not typically subject to frequent change in current third and fourth generation wireless networks.

CPRI has a tight jitter requirement of several nanoseconds. In existing applications jitter is handled by buffering traffic at the receiver. When using a receiver buffer the size of the buffer needs to be engineered to guarantee the jitter requirements which may be dependent on the characteristics of the fronthaul network. The receiver buffer introduces delay into the CPRI flows. This delay is accounted for in a CPRI delay budget, which may reduce the allowable propagation delay in the fronthaul network. By consuming part of the CPRI delay budget to account for receiver buffers, there may be an offsetting reduction in the coverage area of a radio equipment controller. Other approaches are based on using optical networks for fronthaul networks. However, optical networks may not be practical to build in some scenarios. Another approach is based on using Ethernet networks to carry CPRI traffic. However, outside of creating a dedicated point to point connection using Ethernet networking equipment, an Ethernet network cannot typically guarantee the low jitter requirements of a CPRI deployment.

SUMMARY

In one embodiment, the disclosure includes a data traffic scheduling method including selecting, using a network controller, a plurality of flows that traverses a network node, generating, using the network controller, an augmented graph based on a flow rate of the plurality of flows and link capacities of the network node, updating, using the network controller, the augmented graph in response to a request to add a new flow to the plurality of flows, determining, using the network controller, a flow schedule for the new flow that minimizes delay or delay variances of the plurality of flows based on the augmented graph as updated, and outputting, using the network controller, the flow schedule for the new flow.

In another embodiment, the disclosure includes an apparatus including a receiver configured to obtain a network topology, and a processor operably coupled to the receiver, and configured to select a flow that traverses a network node from the network topology, generate an augmented graph based on a flow rate of the flow and link capacities of the network node, compute a flow schedule for the flow using the augmented graph to minimize delay or delay variance of the flow, and output the flow schedule.

In yet another embodiment, the disclosure includes a data traffic scheduling method comprising obtaining, using a network controller, a network topology for a network, generating, using the network controller, an augmented graph based on the network topology, converting, using the network controller, the augmented graph to a mixed-integer linear program, scheduling, using the network controller, a flow in the network using the mixed-integer linear program to minimize delay or delay variance of the flow, and outputting, using the network controller, a flow schedule.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
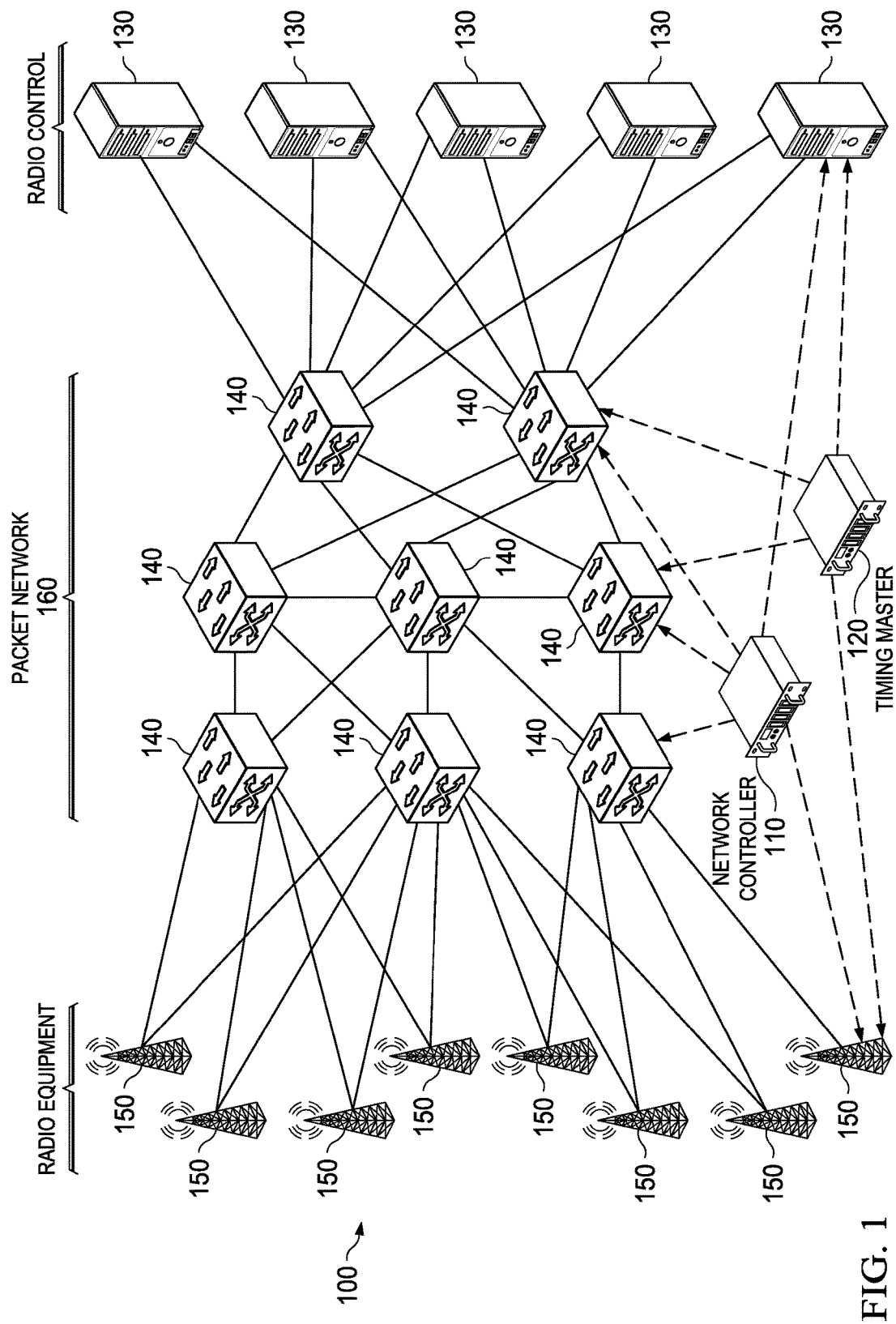
FIG. 1 is an illustration of an embodiment of a network communication system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for engineering traffic on a time sensitive network such as an Institute of Electrical and Electronics Engineers (IEEE) 802.1Qbv time sensitive network. Engineering traffic may comprise generating an augmented graph of a network and using the generated augmented graph to schedule data traffic. A network may be modeled to construct an augmented graph for global scheduling. The augmented graph is configured to model a plurality of slots associated with a transmission cycle and to capture a network topology, network resource availability, link transmission delays, and node switching delays. The augmented graph is also configured to enable routing access to a network while considering bandwidth and delays.

IEEE 802.1Qbv titled, "Bridges and Bridged Networks—Amendment: Enhancements for Scheduled Traffic," specifies time-aware queue-draining procedures in an Ethernet switch than can be used to tightly control delay and jitter in a network. Additional details about IEEE 802.11Qbv networks are described in IEEE standard draft titled, "Bridges and Bridged Networks—Amendment: Enhancements for Scheduled Traffic," originally published in June 2012, which is hereby incorporated by reference as if reproduced in its entirety. This standard uses the notion of a gate (e.g., very short queue) in the switch. The switch can be programmed with a schedule which specifies which gates will be opened at a specific time. When a gate is opened, the traffic queued up for the gate is admitted to the switch and forwarded towards its destination. Higher speed links are divided into more time slots than lower speeds links, in proportion to the ratio of link speeds. So where a 10 gigabits-per-second (Gbps) link may have 4 time slots, a 100 Gbps link would have 40 time slots and a 400 Gbps link to have 160 time slots for the corresponding time period.

A general requirement for scheduling CPRI flows is to minimize delay and jitter on the flow. In a conventional Ethernet network, unscheduled flows will occasionally collide at aggregation nodes and introduce jitter. A potential objective of a data traffic scheduling optimization program is then to minimize the maximum delay of any of the flows in the network. However, all of the CPRI flows in the network may not be able to be added at once and may be added incrementally. Once a flow has been established, it may be unacceptable to relocate it due to the delay or outage this would cause. An incremental data traffic scheduling algorithm may be used where flows are placed in the network one at a time (or where flows are introduced to a network with existing traffic). Establishing flows one at a time means that the optimization objective will be to minimize the delay of the current flow given to the existing flow schedule.

It may also be desirable to partition the network into time slots similar to a time-division multiplexing (TDM) network. Unlike a TDM system, flexibility in configuring the time slot size is offered and a time slot size that suits the problem may be selected. CPRI flow rates are typically restricted to one of 614.4 megabits-per-second (Mbps), 1228.8 Mbps and 2457.6 Mbps. These rates are conveniently integer multiples of the slowest rate. As such, Ethernet links may be divided into time slots that can accommodate the different transmission rates. Using a fixed packet size gives packet transmission rates that are integer multiples.

FIG. 1 is an illustration of an embodiment of a network communication system 100. Network communication system 100 comprises a network controller 110, a timing master 120, data sources 130, switches 140, and data sinks 150 that are interconnected to form a packet-switched network 160. Network communication system 100 may be configured as shown or in any other suitable configuration as would be appreciated by one of ordinary skill in the art upon viewing this disclosure. In an embodiment, network controller 110 is a software-defined network (SDN) controller which may include, but is not limited to, an OpenDaylight SDN controller and an Open Network Operating System (ONOS) SDN controller. In another embodiment, network controller 110 may be a non-SDN network controller. Network controller 110 is configured to perform control plane functions and traffic engineering functions for the packet-switched network 160. For example, network controller 110 can be configured to determine optimal paths for packets that are transmitted in the packet-switched network 160 and to schedule departure times of packets at network nodes (e.g., data sources 130 and switches 140) of the network communication system 100 such that delay and jitter for transmitting the packets over the packet-switched network 160 is minimized. Network controller 110 may also be configured to perform other control plane functions, including but not limited to, network configuration and network monitoring for the packet-switched network 160. Network controller 110 is configured to communicate with network nodes (e.g., data sources 130, switches 140, and data sinks 150) in the network communication system 100. For example, the network controller 110 may be configured to use an OpenFlow protocol to communicate with the network nodes in the network communication system 100. Alternatively, network controller 110 may be configured to communicate with network nodes in the network communication system 100 using any other suitable communication protocol as would be appreciated by one of ordinary skill in the art upon viewing this disclosure. The timing master 120 is a master or grandmaster clock. Additional details for the timing master 120 are described in the IEEE 1588 standard, which is hereby incorporated by reference as if reproduced in its entirety. Although illustrated as connecting to only some of sinks 150, switches 140 and sources 130, it should be understood that network controller 110 and timing master 120 may have a logically direct connection to all nodes in network 100.

In the illustrated embodiment of FIG. 1, the data sources 130 are radio equipment controllers and the data sinks 150 are radio equipment. The data sources 130 are configured to employ CPRI communication with at least one of the data sinks 150 over the packet-switched network 160. The data sources 130 and the data sinks 150 are configured to work together to provide a radio base station that serves a part of a radio access network. Switches 140 are configured to connect network segments within the packet-switched network 160 and to route packets between the data sources 130 and the data sinks 150.

Figure 2:
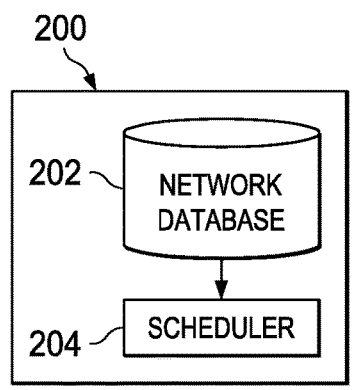
FIG. 2 is an illustration of an embodiment of a network controller.

FIG. 2 is an illustration of an embodiment of a network controller 200. Network controller 200 is employed in a network communication system such as network communication system 100 in FIG. 1. Network controller 200 is configured to perform control plane functions and traffic engineering functions for a packet-switched network within the network communication system. Network controller 200 may be configured so that it can act as network controller 110 in FIG. 1.

Network controller 200 comprises a network database 202 and a scheduler 204. Although not shown in FIG. 2, network controller 200 comprises a memory that stores the network database 202, a network interface for interconnection with nodes in a packet-switched network (such as switch 140 in packet switched network 160), and at least one processor in communication with the memory and the network interface for processing instructions to generate paths and schedules and to provide the paths and schedules to interconnected network nodes. Network database 202 is populated with data relating to the topology and operating characteristics of a network. For example, network database 202 may be configured to store records identifying network nodes (e.g., data sources 130, switches 140, and data sinks 150 in FIG. 1) in the network, identifiers for links that interconnect the network nodes, records that indicate operating characteristics of each link (e.g., data rate and time-of-flight or transmission delay on link), records that indicate operating characteristics (e.g., data rate of each data source, inbound port to outbound port transmission delay through each switch, and throughput of each switch) of each network node.

At least some of the data stored in network database 202 may be obtained prior to initialization of network controller 200. The network database 202 may be updated as the topology and operating characteristics of the network changes, for example, as network nodes and links are added, removed, upgraded, or fail. Updates regarding network condition changes may be received from network nodes or from dedicated monitors that are connected to the network. The network database 202 may be updated in real-time or in about real-time.

When deployed, Scheduler 204 is in data communication with network database 202 and is configured to generate a path for packets that are transmitted in the network and to schedule departure times of packets at the data source and each switch in the path. The departure schedule may also identify a particular queue or port to be used at each data source or switch. Network controller 200 is configured to generate the path and schedule by processing records from network database 202 which may take into account the topology and operating characteristics of the network such as the transmission delay at each network node and through each link. By taking network characteristics into account, the paths and schedules may be optimized to minimize end-to-end delay and jitter of each packet transmitted through the network. For example, packet transmission from an outbound queue of a data source or switch may be scheduled for departure in a particular time slot. The time slot may be selected such that when the packet traverses the link to its destination network node, the packet may be forwarded by the destination network node immediately in a time slot scheduled for the packet. Delay associated with waiting for an available time slot to forward the packet may thereby may be avoided or minimized. Other packets arriving at the destination network node are scheduled such that they arrive at the destination network node in prior or subsequent time slots. As such, other packets may be forwarded without waiting for available time slots. In this way, delay and jitter resulting from contention for transmission resources by multiple arriving packets at a destination node may be avoided or minimized. By scheduling time slots at each successive network node in a path between a data source and a data sink, the packet may traverse the entire path in the scheduled time slots such that end-to-end delay and jitter may be avoided or minimized. In this way, packets for CPRI traffic may be transmitted through the network with delay and jitter that meet CPRI requirements. Network controller 200 may comprise a solver or may be configured to exchange data with a solver. An example of a solver includes, but is not limited to, IBM ILOG CPLEX optimization studio.

Network controller 200 is configured to transmit at least part of the generated path and schedule to each of data sources and switches for implementation. For example, network controller 200 may be configured to generate or to output a schedule (e.g., a schedule file) that may be programmed onto network nodes within a network. Each of the data sources and switches is synchronized to a common clock (e.g., timing master 120 in FIG. 1) that allows the transmission schedules to be implemented precisely and accurately. Network controller 200 may generate a path, update a previously-determined path, or update a schedule in response to changing network topology or changing operating characteristics. For example, network controller 200 may generate or update a path or schedule when links or network nodes are added/removed or when data rates of data sources change. Indeed, the network controller 200 is configured to generate schedules and routing rules so that packets in a CPRI flow are sent along a controlled path and meet their schedule. Network controller 200 may also generate or update a path or schedule periodically. The scheduler 204 may generate schedules that allow margin or slop to provide tolerance for any deviation for the schedule, for example, resulting from clock errors at the data sources or switches. In an embodiment, the network controller 200 may generate and transmit route and schedule data in accordance with the IEEE standard draft for IEEE 802.1Qbv titled, "Bridges and Bridged Networks—Amendment: Enhancements for Scheduled Traffic." Alternatively, the network controller 200 may generate and transmit route and schedule data in accordance with any other suitable protocol as would be appreciated by one of ordinary skill in the art upon viewing this disclosure.

Figure 3:
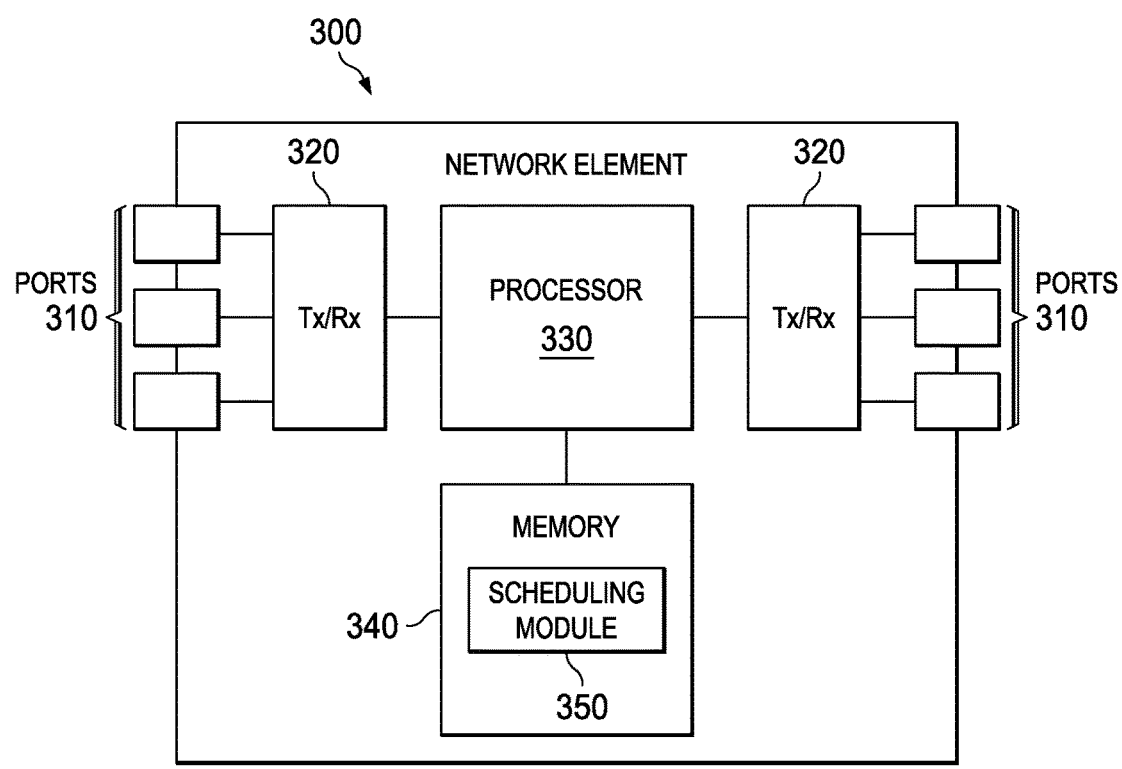
FIG. 3 is an illustration of an embodiment of a network element.

FIG. 3 is a block diagram of an embodiment of a network element 300. The network element 300 may be suitable for implementing the disclosed embodiments. Network element 300 may be any device (e.g., a MODEM, a switch, router, bridge, server, client, controller, etc.) that transports or assists with transporting data through a network, system, and/or domain. Additionally, network element 300 may be a controller that does not transport data itself, but instead acts as a controller. For example, network element 300 may be used to implement network controller 110 in FIG. 1 and network controller 200 in FIG. 2. Network element 300 comprises ports 310, transceiver units (Tx/Rx) 320, a processor 330, and a memory 340 comprising a scheduling module 350. Ports 310 are coupled to Tx/Rx 320, which may be transmitters, receivers, or combinations thereof. The Tx/Rx 320 may transmit and receive data via the ports 310. Processor 330 is configured to process data. Memory 340 is configured to store data and instructions for implementing embodiments described herein. The network element 300 may also comprise electrical-to-optical (EO) components and optical-to-electrical (OE) components coupled to the ports 310 and Tx/Rx 320 for receiving and transmitting electrical signals and optical signals.

The processor 330 may be implemented by hardware and software. The processor 330 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 330 is in communication with the ports 310, Tx/Rx 320, and memory 340.

The memory 340 comprises one or more of disks, tape drives, or solid-state drives and may be used as an over-flow data storage device, to store programs when such programs are selected for execution, and to store instructions and data that are read during program execution. The memory 340 may be volatile and non-volatile and may be read-only memory (ROM), random-access memory (RAM), ternary content-addressable memory (TCAM), and static random-access memory (SRAM). Scheduling module 350 is implemented by processor 330 to execute the instructions for generating an augmented graph for a network and for scheduling data traffic for the network using the augmented graph. The inclusion of scheduling module 350 provides an improvement to the functionality of network element 300. Scheduling module 350 also effects a transformation of network element 300 to a different state. Alternatively, scheduling module 350 is implemented as instructions stored in the processor 330.

Figure 4:
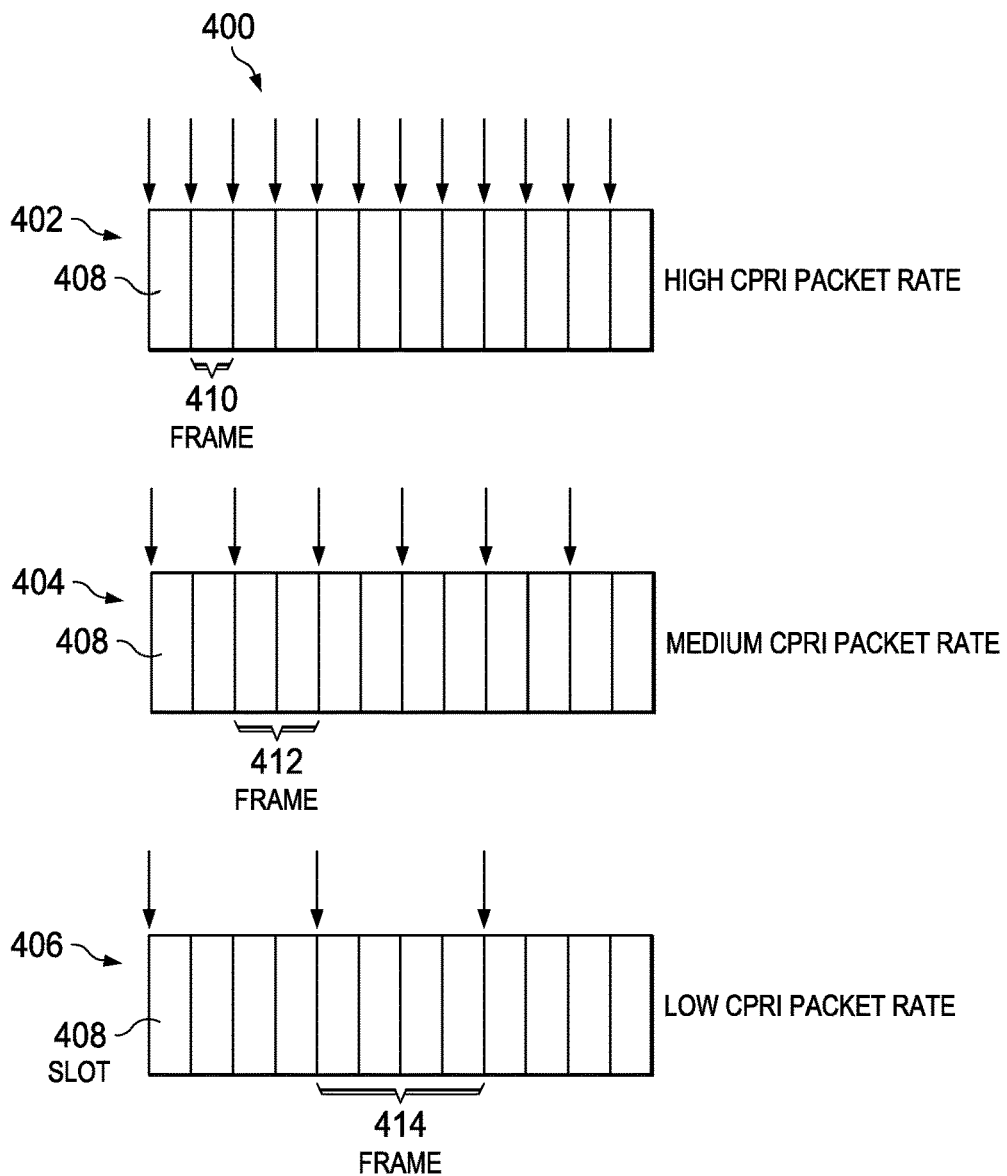
FIG. 4 is a timing diagram of flexible time slot scheduling.

FIG. 4 is a timing diagram 400 of flexible time slot scheduling. A time slot should be available every time a packet is ready to transmit to eliminate or to reduce jitter during packet transmission. FIG. 4 shows a high CPRI packet rate 402, a medium CPRI packet rate 404, and a low CPRI packet rate 406. A slot 408 corresponds to the highest transmission rate, for example, a slot 408 may have a transmission rate of 2457.6 Mbps. Frames 410, 412, and 414 correspond to the lowest transmission rate. Frame 410 comprises one slot 408 for high CPRI packet rate 402. Frame 412 comprises two slots 408 for medium CPRI packet rate 404. Frame 414 comprises four slots 408 for low CPRI packet rate 406. For example, frame 414 may correspond to a transmission rate of 614.4 Mbps. The number of slots 408 in frames 410, 412, and 414 corresponds to the ratio of the highest data rate to the lowest data rate. The slot size may be derived from factors including, but not limited to, the bit rate of the flows and the bit rate of the slowest links in the network. Determining the slot size may comprise determining the available packet sizes, picking a packet rate that gives convenient numbers of packets per second for each flow type on the slowest links in the network, computing the actual slot size based on packet overhead, preemption budget, and clock drift budget, and verifying that the slot size is big enough to carry the desired packet size. The high CPRI packet rate 402, the medium CPRI packet rate 404, and the low CPRI packet rate 406 may be configured with any suitable frame size as would be appreciated by one of ordinary skill in the art upon viewing this disclosure. It should be noted that if the network is sufficiently fast, the highest CPRI packet rate may not map to a single timeslot per frame.

As an example, if there are three packet rates of 2, 5, and 7 packets per second, a frame for supporting all three packet rates will require 2*5*7=70 slots in order to build a jitter free schedule for the different packet rates. The number of slots 408 per frame may be the lowest common multiple of the different packet rates. With an arbitrary gate assumption, large numbers of slots 408 per frame may not work well. For example, IEEE 802.1Qbv may need a separate queue for each slot 408 and only a small number of queues will be available per port. Carrying CPRI traffic in Ethernet frames puts bounds on the slot size, for example, slot sizes may be between 50 bytes to 1250 bytes. For a packet size of 500 bytes, which is 4000 bits, a bit rate of 2457.6 Mbps would require $2457.6*10^6/4000=614400$ packets per second, which corresponds to a packet inter-arrival time of 1627.6 nanoseconds (nsec). Supposing that the slowest link rate on the network is 10 Gbps, a packet inter-arrival time of 1627.6 nsec allows packet lengths of up to $10*10^9*1627.6=16276$ bits (2034 bytes) to be supported. The slot time is 1627.6 nsec, but 500 bytes of data is transmitted in this slot. Some additional margin in the slot size may also be provided. If the network is carrying background priority traffic, then IEEE 802.1Qbv frame preemption may need to be enabled and the slots may need to include enough time to allow the switch to preempt a low priority frame. Each packet may have overhead for Ethernet and other networking protocol (e.g. Internet Protocol (IP)) packet headers that need to be accounted for. There may also be some overhead to allow for clock drift between network nodes, for example, on the order of nanoseconds, which translates into 10's of bits at 10 Gbps and 100's of bits at 100 Gbps.

Additional information for flexible time slot scheduling is described in U.S. application Ser. No. 14/824,608 filed on Aug. 12, 2015 by Peter Ashwood-Smith, et al., which is hereby incorporated by reference as if reproduced in its entirety.

Figure 5:
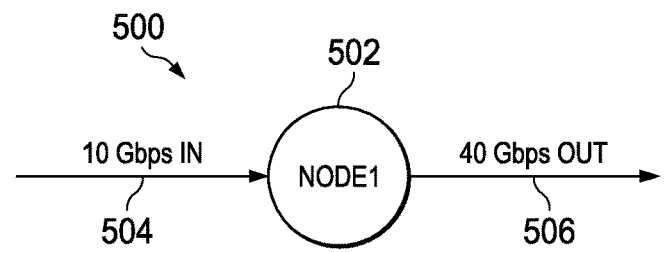
FIG. 5 is a model of a network node configuration.

FIG. 5 is a model of a network node configuration 500. The network node configuration 500 may be used to represent a network node in a network communication system such as network communication system 100 in FIG. 1. The network node configuration 500 may be modeled as a portion of an augmented graph that incorporates the concepts of time slots and the delay in transitioning between time slots. Network node configuration 500 comprises a network node 502 with an incoming link 504 and an outgoing link 506. The incoming link 504 is configured for 10 Gbps and the outgoing link 506 is configured for 40 Gbps. The network node configuration 500 may be configured as shown or in any other suitable configuration. For example, the incoming link 504 and/or the outgoing link 506 may have any other suitable packet rate.

Figure 6:
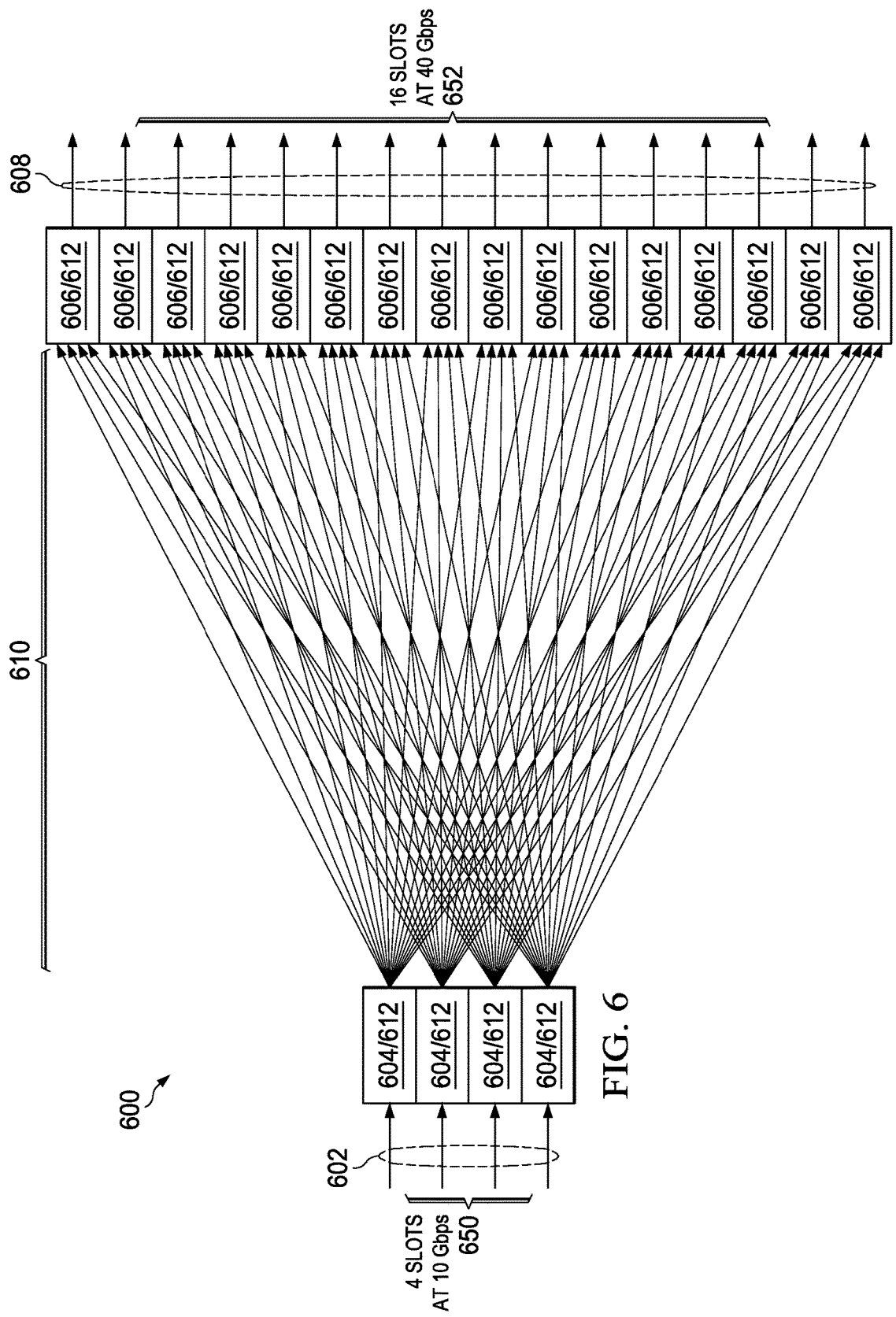
FIG. 6 is an illustration of an embodiment of a portion of an augmented graph that is configured with an intra-nodal mesh interconnect.

FIG. 6 is an illustration of an embodiment of a portion 600 of an augmented graph that is configured with an intra-nodal mesh interconnect. Portion 600 is configured similar to network node configuration 500 in FIG. 5 and is configured to implement flexible time slot scheduling similar to the flexible time slot scheduling that is described in FIG. 4. Portion 600 comprises a 10 Gbps incoming link 602 and a 40 Gbps outgoing link 608. Alternatively, the incoming link 602 and/or the outgoing link 608 may have any other suitable packet rate. Based on calculations for computing the size of the flexible slots, it can be determined that a 10 Gbps link may use 4 ingress slots 604 to carry a frame 650 and a 40 Gbps link may use 16 egress slots 606 to carry a frame 652. Ingress slots 604 and egress slots 606 may also be referred to as vertices for an augmented graph. The increased traffic rate on the higher speed outgoing link 608 allows portion 600 to carry more egress slots 606 in the same frame time.

Using portion 600, paths can be built through a network with controlled delay characteristics using minimum delay path algorithms. For a flow that needs only one time slot, a minimum delay path may be computed using algorithms such as Dijkstra's algorithm. Additional details about Dijkstra's algorithm are described in, "A Note on Two Problems in Connexion with Graphs," by E. W. Dijkstra published on Jun. 11, 1959 and in, "The Algorithm Design Manual," by S. Skiena published in 2008, which are hereby incorporated by reference as if reproduced in their entirety. Alternatively, computing the minimum delay path may be performing using other algorithms such as the Bellman-Ford algorithm, A* search algorithm, Floyd-Warshall algorithm, Johnson's algorithm, or any other suitable algorithm as would be appreciated by one of ordinary skill in the art upon viewing this disclosure. Additional details for algorithms for computing the minimum delay path are described in, "A Formal Basis for the Hueristic Determination of Minimum Cost Paths," by P. E. Hart, et al., published in 1968, in "Algorithm 97: Shortest Path," by Robert W. Floyd published in June 1962, and in "Efficient algorithms for shortest paths in sparse networks," by Donald B. Johnson published in 1977, which are all hereby incorporated by reference as if reproduced in their entirety. Minimum delay paths are inherently zero jitter as transmission times are allocated to each flow at each step in the network. Flows requiring multiple slots may require a more sophisticated path computation and multiple paths through the network. A flow may refer to a traffic flow, a single packet, a packet flow, or a network flow, which is a sequence of packets from a source to a destination. A path refers to a route that a flow uses to traverse a network or at least a portion of the network. A flow may have multiple paths through the network. It is desirable to make the delay across each path the same.

The ingress slots 604 are coupled to the egress slots 606 using a full mesh interconnect of logical links 610 between all the slots on all the ports. Logical links 610 may also be referred to as arcs for the augmented graph. Every ingress slot 604 is connected to every egress slot 606 on the portion 600. Each of the logical links 610 can be assigned a delay (e.g., a propagation delay) which incorporates the delay inherent in changing slots. The delay may also incorporate the switching delay in the portion 600. Each ingress slot 604 and egress slot 606 on each port becomes or is associated with a logical node 612 in this portion 600. For example, if a portion 600 has 8 links with 16 slots per link, a total of 8*16=128 logical nodes and (8*16) slots*(7*16) connections per slot=14,336 logical links have to be built.

Figure 7:
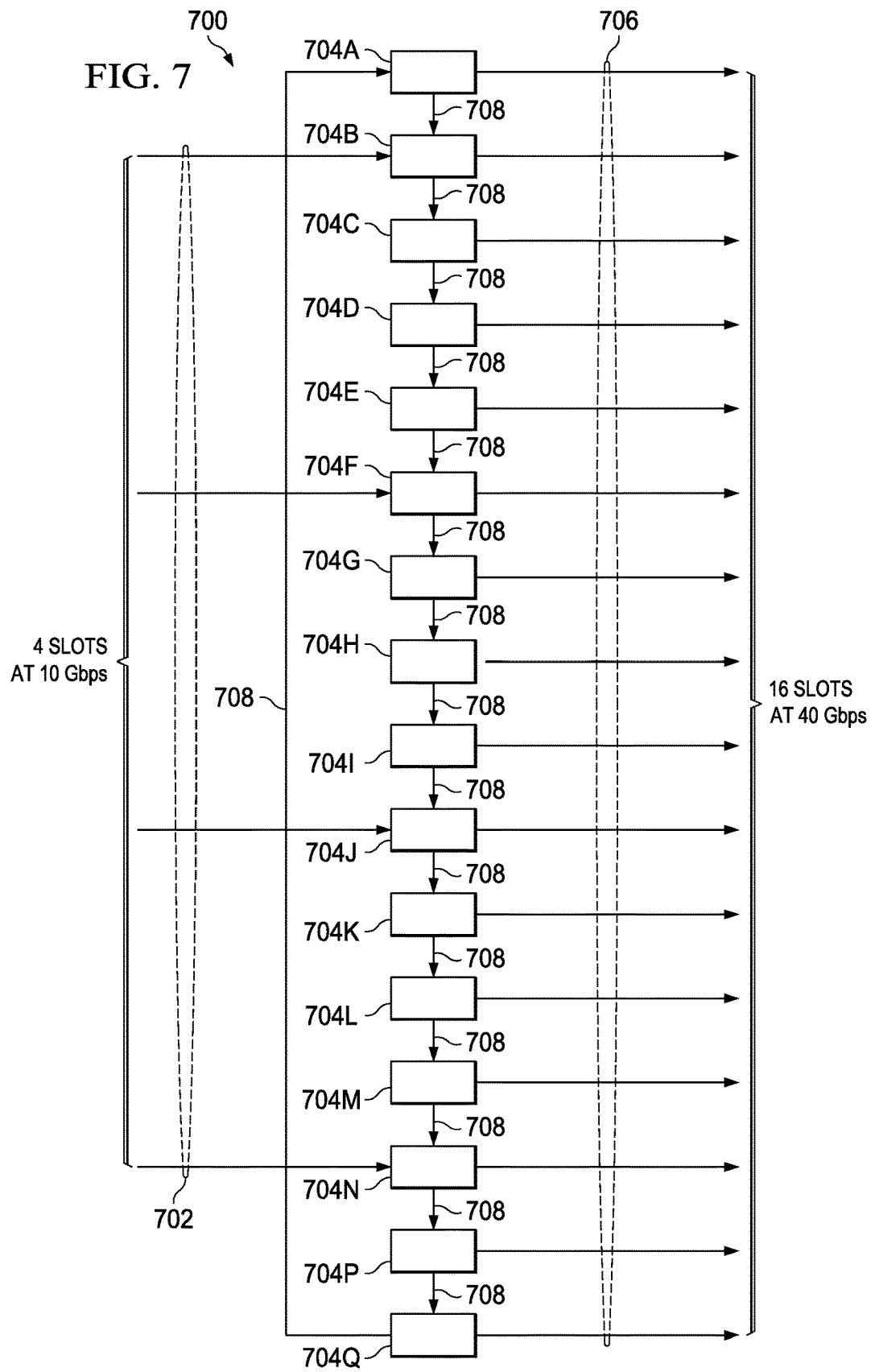
FIG. 7 is an illustration of an embodiment of a portion of an augmented graph that is configured with an intra-nodal chain.

FIG. 7 is an illustration of an embodiment of a portion 700 of an augmented graph that is configured with an intra-nodal chain. Portion 700 is configured similar to network node configuration 500 in FIG. 5 and is configured to implement flexible time slot scheduling similar to the flexible time slot scheduling that is described in FIG. 4. Portion 700 comprises a 10 Gbps incoming link 702 and a 40 Gbps outgoing link 706.

In an embodiment, portion 700 may be generated by applying a shortest path algorithm to a portion of an augmented graph that is configured with an intra-nodal mesh interconnect such as portion 600 in FIG. 6. When the switching delay of portion 700 is treated as a constant, a full mesh of logical links (e.g., logical links 610 from FIG. 6) can be substituted with a chain of logical nodes 704A, 704B, 704C, 704D, 704E, 704F, 704G, 704H, 704I, 704J, 704K, 704L, 704M, 704N, 704P, and 704Q, which may be collectively referred to as logical nodes 704A-704Q. Logical nodes 704A-704Q may also be referred to as vertices for an augmented graph. The logical nodes 704A-704Q in the chain are connected by logical links 708 such that each logical link 708 has a delay that represents the propagation delay in changing from slot to slot in the node. Logical links 708 may also be referred to as arcs for the augmented graph. The final logical link 708 in the chain connects back up to the top of the chain to allow for delays which exceed a complete frame in duration or delays from the previous transmission cycle. For example, the final logical link 708 in the chain connects from logical node 704Q to logical node 704A. The switching delay of portion 700 can be incorporated into either the incoming link delay or the outgoing link delay, as long as it is done consistently for the augmented graph.

The number of logical nodes 704A-704Q in the chain may be bounded by the least common multiple of the number of slots in incoming link 702 and the outgoing link 706 of portion 700. In this example 4 slots are on the incoming link 702 at logical nodes 704B, 704F, 704J, and 704N and 16 slots are on the outgoing link 706 at logical nodes 704A-704Q. The least common multiple of 4 and 16 is 16, so there are 16 logical nodes 704A-704Q to represent portion 700 in the augmented graph. The incoming link 702 skips logical nodes 704A, 704C-704E, 704G-704I, 704K, 704M, 704P, and 704Q to account for the longer term per slot on the 10 Gbps link as compared to the 40 Gbps link. It may be convenient to have link rates as integer multiples.

Slots are associated with the transmission cycle for a flow. Slot sizes can be chosen with integer slot sizes to avoid rational slot sizes when possible. Ethernet rates typically have small least common multiples, for example, 1 Gbps, 10 Gbps, 40 Gbps, 100 Gbps, and 400 Gbps. In many cases the number of logical nodes 704A-704Q can be further reduced. For example, for a 40 Gbps incoming link 702 with 16 slots and a 100 Gbps outgoing link 706 with 40 slots the least common multiple is 80. However many of these logical nodes may not be used and can be removed, for example, leaving 44 logical nodes.

This approach dramatically improves the scalability. The number of internal logical nodes 704A-704Q may not be the total number of slots on the incoming link 702 and the outgoing link 706. However, the number of internal logical nodes 704A-704Q is still an upper bound. Instead the number of logical nodes 704A-704Q may be close to the number of slots on the fastest link. The number of logical links 708 is no longer a polynomial of the total number of slots, but may be the same as the number of logical nodes 704A-704Q.

Figure 8:
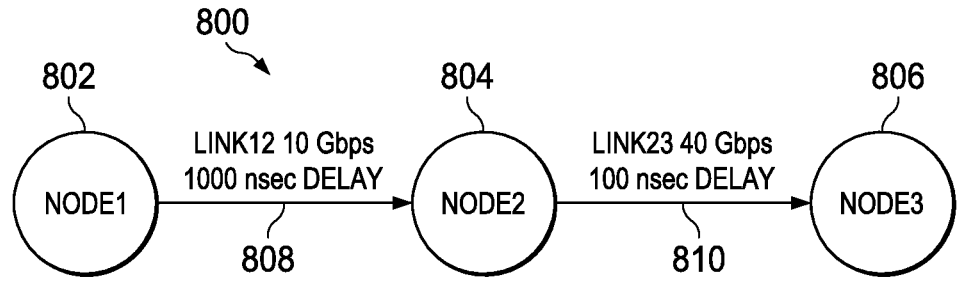
FIG. 8 is an illustration of an embodiment of a network that may be implemented as an augmented graph.

FIG. 8 is a nodal diagram of an embodiment of a network 800 that may be modeled as an augmented graph. Network 800 comprises a first network node 802, a second network node 804, and a third network node 806. As an example, the first network node 802, the second network node 804, and the third network node 806 may correspond to a data source 130, a switch 140, and a data sink 150 in FIG. 1, respectively. The second network node 804 is coupled to first network node 802 using an incoming link 808 that is configured for 10 Gbps with a 1000 nsec delay. The second network node 804 is coupled to the third network node 806 using an outgoing link 810 that is configured for 10 Gbps with a 100 nsec delay. Network 800 may be configured as shown or in any other suitable configuration. For example, the incoming link 808 and/or the outgoing link 810 may have any other suitable packet rate.

Figure 9:
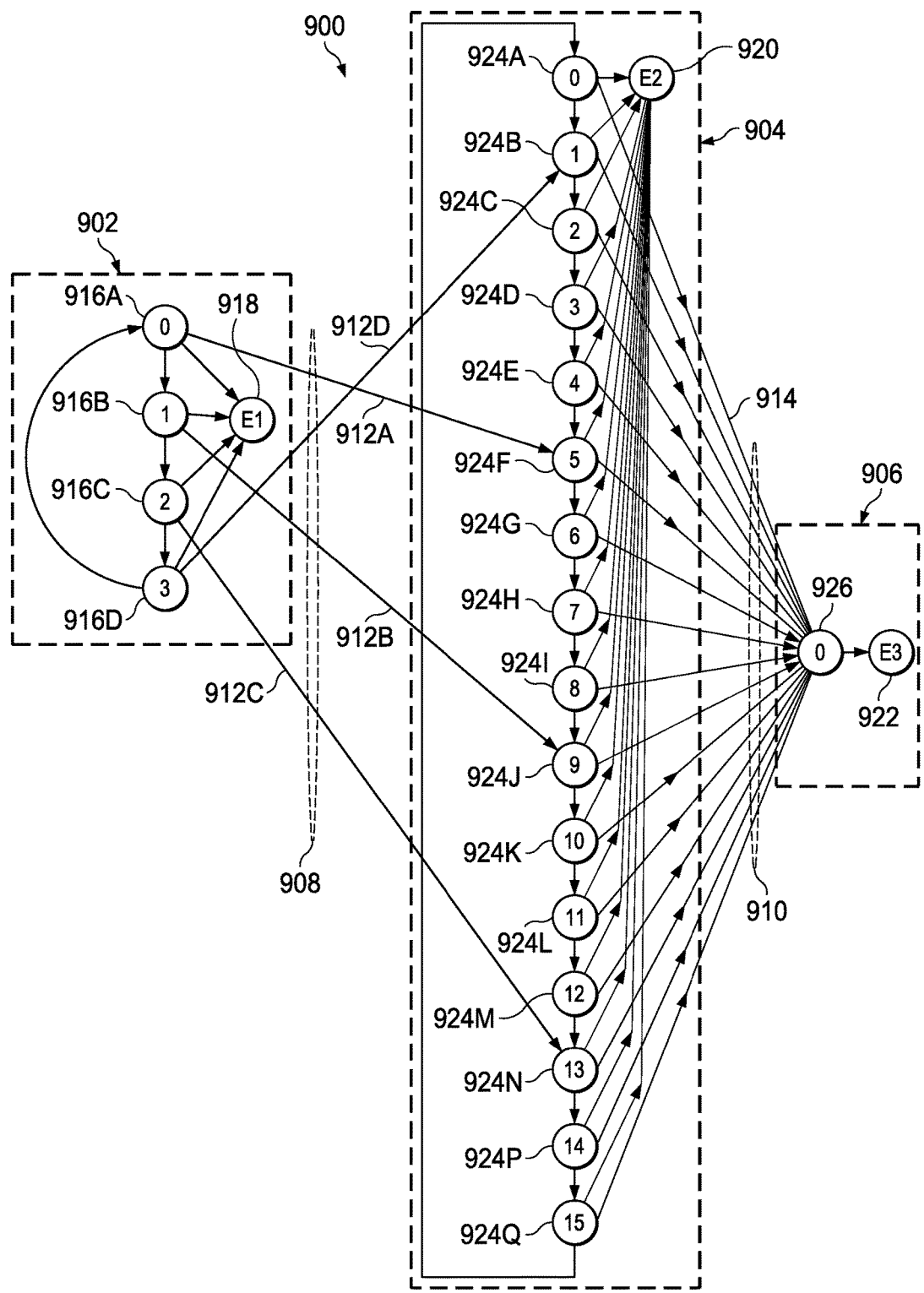
FIG. 9 is an illustration of an embodiment of an augmented graph.

FIG. 9 is an illustration of an embodiment of an augmented graph 900. The augmented graph 900 is configured similar to network 800 in FIG. 8 and is configured to implement flexible time slot scheduling similar to the flexible time slot scheduling that is described in FIG. 4. The augmented graph 900 comprises a first network node 902, a second network node 904, and a third network node 906. The first network node 902, the second network node 904, and the third network node 906 may be configured similar to the first network node 802, the second network node 804, and the third network node 806 in FIG. 8, respectively. The second network node 904 is coupled to the first network node 902 using an incoming link 908 that is configured for 10 Gbps with 4 slots 912A, 912B, 912C, and 912D. The second network node 904 is coupled to the third network node 906 using an outgoing link 910 that is configured for 40 Gbps with 16 slots 914. The links between the first network node 902, the second network node 904, and the third network node 906 (i.e., incoming link 908 and outgoing link 910) may also be referred to as inter-nodal links or horizontal links.

The first network node 902 is configured with an intra-nodal chain similar to portion 700 in FIG. 7. The first network node 902 has only the 10 Gbps incoming link 908 connected to it, so the first network node 902 has 4 logical nodes 916A, 916B, 916C, and 916D. A new logical node, called an egress node is attached to each network node. For example, a first egress node 918 is coupled to the first network node 902, a second egress node 920 is coupled to the second network node 904, and a third egress node 922 is coupled to the third network node 906. The egress node is the egress point for flows that terminate at the physical node. Egress nodes may not be mathematically required, however they may simplify the programming logic for building an optimization program. The second network node 904 is configured with an intra-nodal chain similar to portion 700 in FIG. 7. The second network node 904 has a 10 Gbps incoming link 908 and a 40 Gbps outgoing link 910 connected to it, so the second network node 904 has a total of 16 logical nodes 924A, 942B, 924C, 924D, 924E, 924F, 924G, 924H, 924I, 924J, 924K, 924L, 924M, 924N, 924P, and 924Q, which may be collectively referred to as 924A-924Q. Delays in augmented graph 900 are represented by the spacing between logical nodes. For example, the spacing between each of the logical nodes 924A-924Q may be about 200 nsec. Slot 912A in the incoming link 908 is coupled to logical node 924F in the second network node 904 to represent the 1000 nsec link delay for the incoming link 908. The third network node 906 has no egress links, and thus the third network node 906 has no slot transition delay and comprises only one logical node 926.

Figure 10:
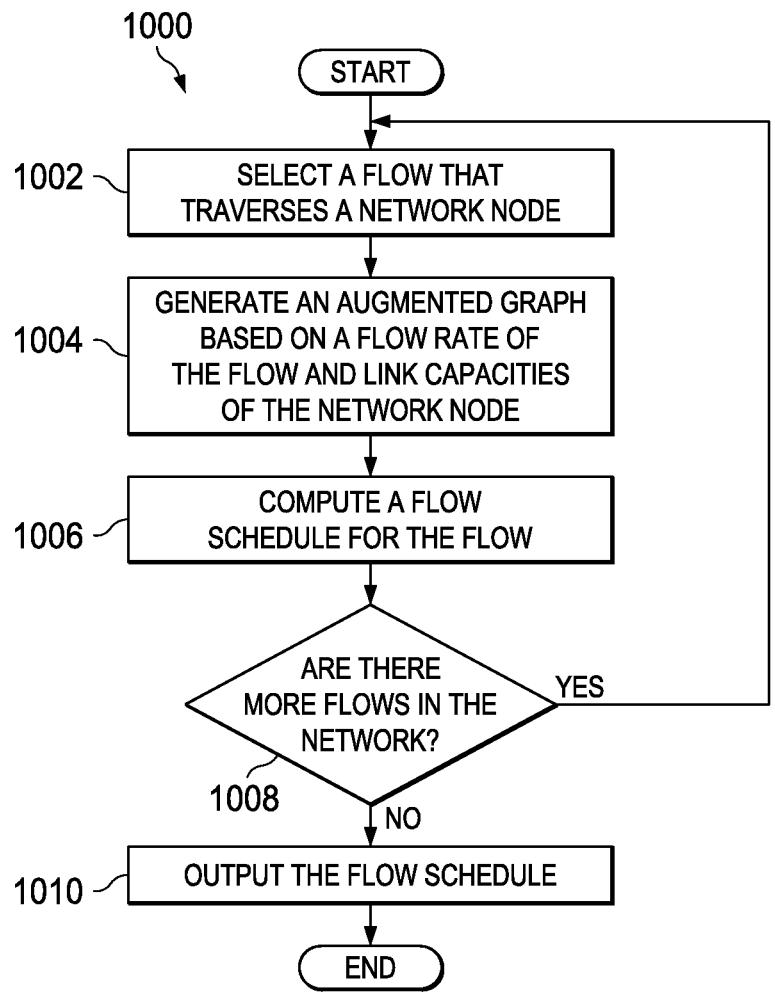
FIG. 10 is a flowchart of an embodiment of a scheduling method for an augmented graph.

FIG. 10 is a flowchart of an embodiment of a scheduling method 1000 for a network using an augmented graph. Method 1000 is implemented to generate an augmented graph for a network and to schedule flows in the network using the augmented graph. Method 1000 may be implemented by a network controller or a network element, for example, network controller 110 in FIG. 1, network controller 200 in FIG. 2, or network element 300 in FIG. 3. Method 1000 may be employed when scheduling data traffic using an augmented network similar to augmented network 900 in FIG. 9.

At step 1002, the network controller selects a flow that traverses a network node for which a schedule will be computed. For example, the network may be a packet-switched network similar to packet-switched network 160 in FIG. 1. At step 1004, the network controller generates an augmented graph based on a flow rate of the flow and the link capacities of the network node. An augmented graph may be generated similarly to augmented graph 900 in FIG. 9, portion 600 in FIG. 6, or portion 700 in FIG. 7. The network controller determines a number of slots that are required for the flow. In an embodiment, the network controller may build one path through the network for each required slot. At step 1006, the network controller computes a flow schedule for the flow using the augmented graph and minimum delay path algorithms to minimize the delay or the delay variance of the flow. For example, computing the flow schedule for the flow may comprise employing path computations similar to the optimization programs described in "Routing, Flow, and Capacity Design in Communications and Computer Networks," by Michal Pioro, et al., published in 2004, and in "Linear Programming foundations and Extensions," by Robert Vanderbei, published in 2008, which are both hereby incorporated by reference as if reproduced in their entirety. As an example, network nodes in the augmented graph may be denoted as $N_1$. Links between the network nodes in the augmented graph may be denoted as $L_{ij}$, where the first subscript, i, identifies a forwarding network node and the second subscript, j, identifies a receiving network node. Each link has some delay denoted as $d_{ij}$. Each path through the network can be identified by $F_k$. Optimization variables are then indicator variables which identify whether a path uses a link. Indicator variables may be denoted as $f_{kij}$, where the first subscript, k, indicates the path and the second subscript, i, and the third subscript, j, identify a link.

Using the variables described above, constraints such as flow conservation constraints and link capacity constraints can be defined for the optimization process. Flow conservation constraints may include, but are not limited to, a constraint that a flow is conserved at every network node. For example, for all j the constraints are:

$$\Sigma_{N_j} f_{kij} - \Sigma_{N_j} f_{kji} = -1, \text{ when } j \text{ is an egress node for flow } k, \quad (1)$$

$$\Sigma_{N_j} f_{kij} - \Sigma_{N_j} f_{kji} = 1, \text{ when } j \text{ is an ingress node for flow } k, \quad (2)$$

$$\Sigma_{N_j} f_{kij} - \Sigma_{N_j} f_{kji} = 0, \text{ otherwise.} \quad (3)$$

Link capacity constraints may include, but are not limited to, a constraint that each slot on an external link is only used by one path. For example, for all external links $L_{ij}$ the constraints are:

$$0 \leq \Sigma_k f_{kij} \leq 1. \quad (4)$$

The indicator variables are either 0 or 1 as it is not acceptable to split a path:

$$f_{kij} \in \{0,1\}. \quad (5)$$

All the paths for the flow may have the same delay. A new variable, t, is used to track the flow delay. These constraints for all paths in the problem are then:

$$\Sigma_{L_{ij}} f_{kij} d_{ij} = t. \quad (6)$$

Additionally, the network controller may wish to minimize the delay for the flow by minimizing t. The number of optimization variables is the product of the number of paths to be computed and the total number of logical nodes and logical links. The number of paths being computed may be a factor in scalability. Alternatively, any other suitable traffic engineering algorithm may be used to select a flow to schedule in the network as would be appreciated by one of ordinary skill in the art upon viewing this disclosure.

The network controller may optionally remove the slots used by the flow in the inter-nodal links. These slots are no longer available for scheduling. At step 1008, the network controller determines whether there are more flows to schedule in the augmented graph. The network controller returns to step 1002 when there are more flows to schedule in the augmented graph. If multiple flows are ready to be scheduled simultaneously, a good heuristic is to schedule the highest rate flows first. Otherwise, the network controller proceeds to step 1010 when there are no more flows to schedule in the augmented graph.

At step 1010, the network controller outputs the flow schedule. Examples of a flow schedule include, but are not limited to, a schedule file, a schedule summary, and schedule program instructions. For example, the network controller may generate and output schedule program instructions that may be programmed into one or more network nodes in the network. Additionally or alternatively, the network controller may store the flow schedule into a memory as a schedule file.

Figure 11:
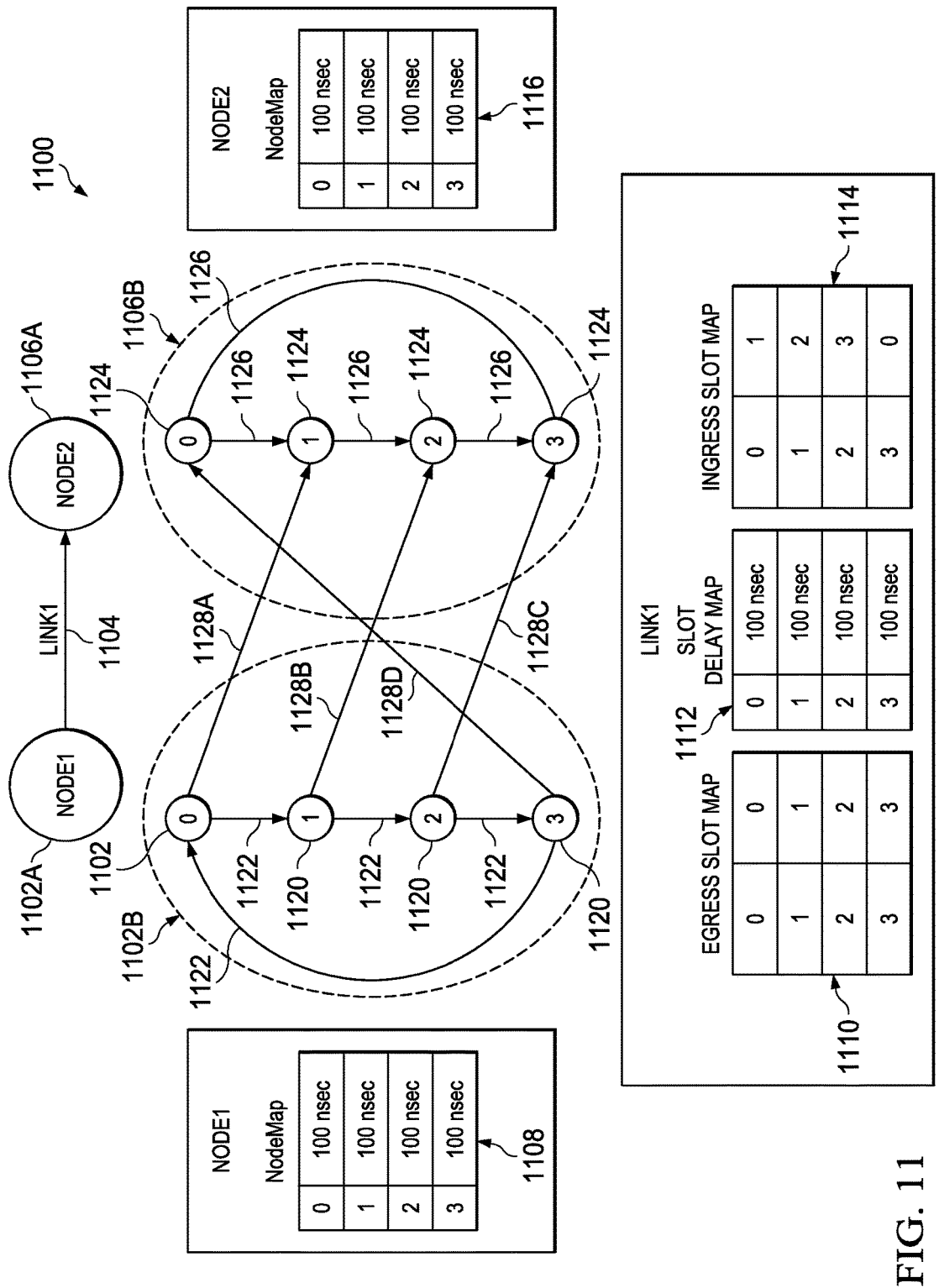
FIG. 11 is an illustration of an embodiment of a data model that may be used for flow scheduling in an augmented graph.

FIG. 11 is an illustration of an embodiment of a data model 1100 that may be used for flow scheduling in an augmented graph. In an embodiment, data model 1100 may be built when a network controller loads a network topology into a solver. After the data structures in the data model 1100 have been constructed, the solver transforms the data model 1100 data structures into a mixed-integer linear program (MILP) for a network.

The network comprises a first network node 1102A coupled to a second network node 1106A using a link 1104. The first network node 1102A and the second network node 1106A are modeled as a first portion 1102B and a second portion 1106B of an augmented graph, respectively. The first portion 1102B and the second portion 1106B are configured with intra-nodal chains similar to portion 700 in FIG. 7. The first portion 1102B comprises a chain of logical nodes 1120 that are connected to each other using logical links 1122. The second portion 1106B comprises a chain of logical nodes 1124 that are connected to each other using logical links 1126. Link 1104 is configured with 4 slots that correspond with logical links 1128A, 1128B, 1128C, and 1128D.

The augmented graph is modelled by associating mapping tables to link objects (e.g., link 1104) and network node objects (e.g., the first network node 1102A and the second network node 1106A) in the network. For example, the first network node 1102A is associated with a first network node mapping (NodeMap) table 1108, the second network node 1106A is associated with a second NodeMap table 1116, and link 1104 is associated with an egress slot mapping table 1110, a slot delay mapping table 1112, and an ingress slot mapping table 1114. A NodeMap table comprises information for a network node including, but not limited to, the number of logical nodes for the network node, logical nodes identifiers, slot identifiers, and delays associated with moving to the next logical node or slot. For example, the first NodeMap table 1108 and the second NodeMap table 1116 each comprise four entries. Each entry identifies a logical node or slot and a delay associated with moving to the next logical node or slot. The egress slot mapping table 1110, the slot delay mapping table 1112, and the ingress slot mapping table 1114 comprise information for link 1104 and are used to implement logical links 1128A-1128D between the first portion 1102B and the second portion 1106B. The egress slot mapping table 1110 identifies slots and logical nodes 1120 in the first portion 1102B that are connected to the logical links 1128A-1128D between the first portion 1102B and the second portion 1106B. The slot delay mapping table 1112 identifies delays associated with moving from a slot or logical node 1120 in the first portion 1102B to a slot or logical node 1124 in the second portion 1106B via the logical links 1128A-1128D. In an embodiment, the slot delay mapping table 1112 may be optional when the delay between slots is always the same. The ingress slot mapping table 1114 identifies the mapping between slots or logical nodes 1120 in the first portion 1102B and slots or logical nodes 1124 in the second portion 1106B.

Figure 12:
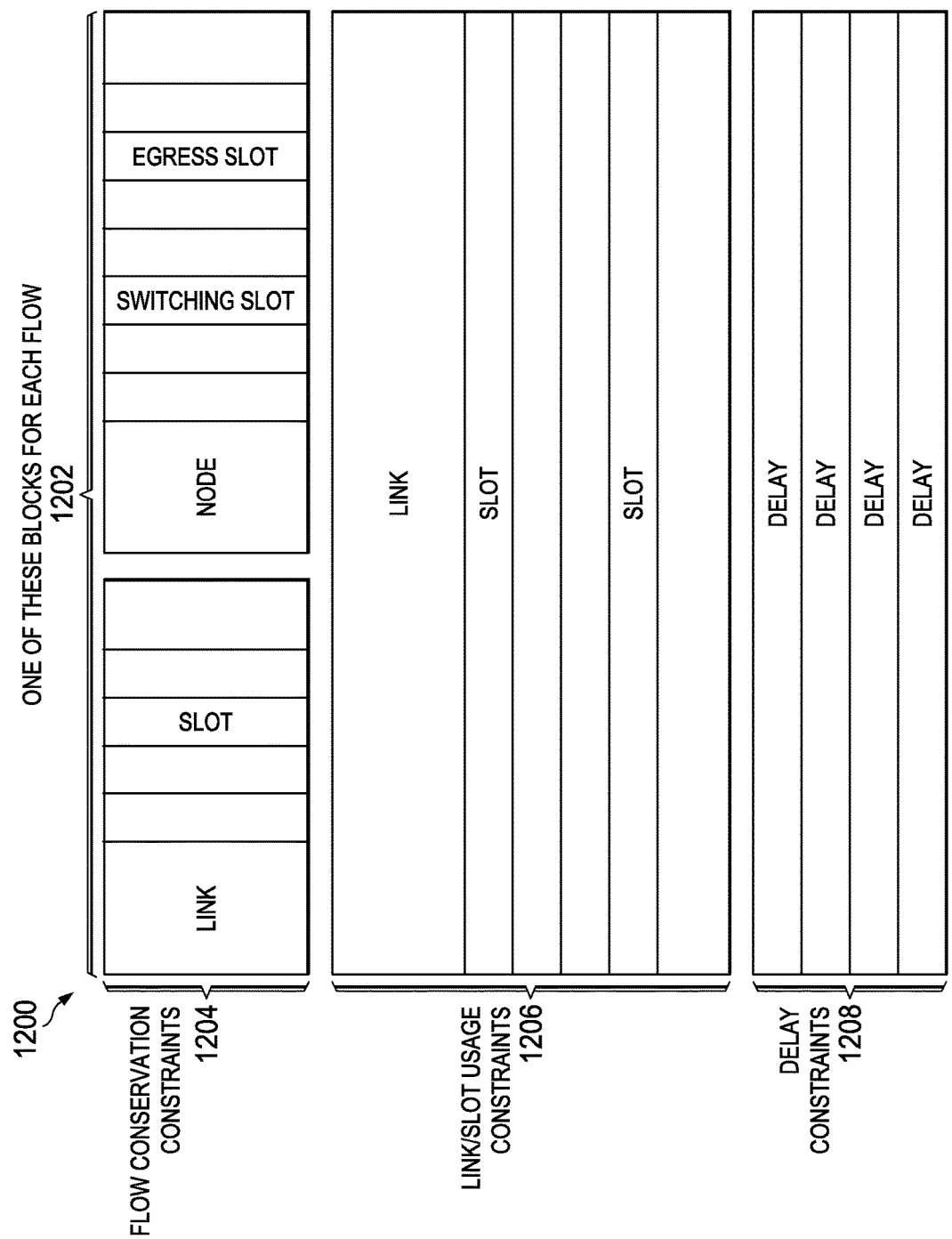
FIG. 12 is an illustration of an embodiment of a linear program structure.

FIG. 12 is a block diagram of an embodiment of a linear program structure 1200. A linear program structure 1200 may be used by a network controller that employs an optimization program for solving a mixed-integer linear program. A network controller may be configured similarly to network controller 110 in FIG. 1 and network controller 200 in FIG. 2. For example, once an augmented graph has been built, an optimization program may convert the augmented graph to a mixed-integer linear program by using linear program structure 1200.

A linear program structure 1200 may be organized as a table. The columns of the table are the optimization variables and the rows of the table are the constraints. The optimization variables may be organized into blocks 1202 by path. For each path, the variables may be ordered first by the external links (e.g., between physical network nodes) and then by the internal links. Block 1202 repeats with a new block for every path. In an embodiment, the linear program structure 1200 comprises flow conservation constraints 1204, link/slot usage constraints 1206, and delay constraints 1208. For example, the constraints may be organized such that the flow conservation constraints 1204 are followed by the link/slot usage constraints 1206, and the delay constraints 1208. Flow conservation constraints 1204 may be established to ensure that flows through network nodes or an augmented network are conserved. Examples of flow conservation constraints 1204 are equations (1), (2), and (3) in step 1002 of FIG. 10. Link/slot usage constraints 1206 may be established to ensure that slots in external links can only be used once. An example of a link slot usage constraint 1206 is equation (4) in step 1002 of FIG. 10. An example of a delay constraint 1208 is equation (6) in step 1002 of FIG. 10. A delay constraint 1208 may comprise a plurality of entries with the same delay when a flow uses multiple paths. Using the linear program structure 1200 the optimization program can compute flows incrementally or several flows at once.

Figure 13:
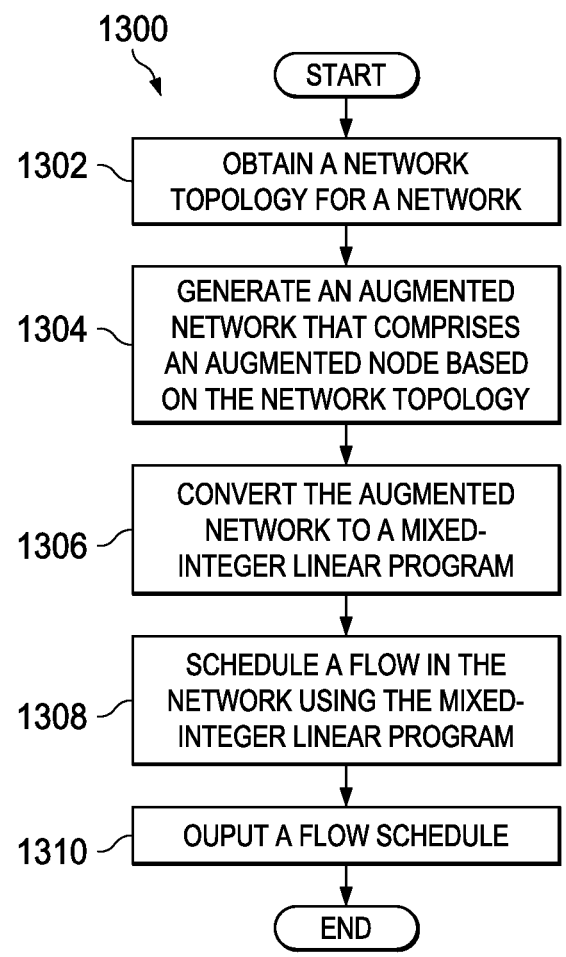
FIG. 13 is a flowchart of an embodiment of a data traffic scheduling method for an augmented graph.

FIG. 13 is a flowchart of an embodiment of a data traffic scheduling method 1300 for an augmented graph. Method 1300 is implemented to schedule flows in an augmented graph by a network controller or a network element, for example, network controller 110 in FIG. 1, network controller 200 in FIG. 2, or network element 300 in FIG. 3. Method 1300 may be employed when scheduling data traffic using an augmented graph similar to augmented graph 900 in FIG. 9.

At step 1302, the network controller obtains a network topology for a network. For example, the network controller may obtain a network topology using a link layer discovery protocol, a link state protocol (e.g., an open shortest path first (OSPF) protocol or an intermediate system to intermediate system (IS-IS) protocol), a planning tool, or any other protocol or tool as would be appreciated by one of ordinary skill in the art upon viewing this disclosure. At step 1304, the network controller generates an augmented graph based on the network topology. An augmented graph may be generated similarly to augmented graph 900 in FIG. 9, portion 600 in FIG. 6, or portion 700 in FIG. 7. At step 1306, the network controller converts the augmented graph to a mixed-integer linear program. For example, the network controller may obtain constraints (e.g., flow conservation constraints 1204, link/slot usage constraints 1206, and/or delay constraints 1208 in FIG. 12), apply the constraints to the network topology and flow requests, and loads the network topology into a solver to create the mixed-integer linear program. The network controller may convert the augmented graph to a mixed-integer linear program by using data models and linear program structures similar to data model 1100 in FIG. 11 and linear program structure 1200 in FIG. 12, respectively. At step 1308, the network controller schedules a flow in the network using the mixed-integer linear program to minimize the delay or the delay variance of the flow. Scheduling a flow in the network may be performed in a manner similar to method 1000 in FIG. 10. For example, the network controller may obtain a solution that comprises optimization variables from the solver to determine flow schedules.

At step 1310, the network controller outputs a flow schedule. Examples of a flow schedule include, but are not limited to, a schedule file, a schedule summary, and schedule program instructions. For example, the network controller may generate and output schedule program instructions that may be programmed into one or more network nodes in the network. Additionally or alternatively, the network controller may store the flow schedule into a memory as a schedule file.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A data traffic scheduling method in a network, the method comprising:
    selecting, using a network controller of the network, a plurality of flows that traverse a network node;
    generating, using the network controller, an augmented graph based on a flow rate of the plurality of flows and link capacities associated with a plurality of logical links of the network node;
    updating, using the network controller, the augmented graph after a new flow has been added to the plurality of flows, wherein the augmented graph comprises configuration representing the network node,
    the configuration comprises a first plurality of ingress slots of the network node corresponding to an ingress link of the network node, a second plurality of egress slots of the network node corresponding to an egress link of the network node, and
    logical links of the network node, a first number of the first plurality of ingress slots is based on a first data rate of the ingress link of the network node, a second number of the second plurality of egress slots is based on a second data rate of the egress link of the network node, each of the ingress slots is connected to each of the egress slots, and each of the logical links represents a link propagation delay between one of the ingress slots and one of the egress slots;
    determining, using the network controller, a flow schedule for the new flow that minimizes delay or delay variances of the plurality of flows based on the augmented graph as updated; and
    outputting, using the network controller, the flow schedule for the new flow to the network node in order to program the network node for implementation of the flow schedule.

2. The method of claim 1, wherein a portion of the augmented graph comprises an intra-nodal mesh interconnect.

3. The method of claim 1, wherein a portion of the augmented graph comprises an intra-nodal chain.

4. The method of claim 1, wherein determining the flow schedule comprises using a mixed-integer linear program.

5. The method of claim 1, wherein computing the flow schedule comprises using a minimum delay path algorithm.

6. The method of claim 1, further comprising assigning, using the network controller, a plurality of slots that are associated with a transmission cycle for the new flow.

7. The method of claim 1, further comprising transmitting the outputted flow schedule to the network node.

8. An apparatus comprising:
    a receiver configured to obtain a network topology; and
    a processor operably coupled to the receiver, and configured to:
    select a flow among the plurality of flows that traverses a network node from the network topology;
    generate an augmented graph based on a flow rate of the flow and link capacities associated with a plurality of logical links of the network node,
    update the augmented graph after the flow has been added to the plurality of flows,
    wherein the augmented graph comprises configuration representing the network node, the configuration comprises a first plurality of ingress slots of the network node corresponding to an ingress link of the network node, a second plurality of egress slots of the network node corresponding to an egress link of the network node, and a third plurality of logical links of the network node, a first number of the first plurality of ingress slots is based on a first data rate of the ingress link of the network node, a second number of the second plurality of egress slots is based on a second data rate of the egress link of the network node, each of the ingress slots is connected to each of the egress slots, and each of the logical links is assigned with a propagation delay between one of the ingress slots and one of the egress slots;
    compute a flow schedule for the flow using the augmented graph to minimize delay or delay variance of the flow based on the augmented graph as updated; and
    output the flow schedule to the network node in order to program the network node for implementation of the flow schedule.

9. The apparatus of claim 8, wherein a portion of the augmented graph comprises an intra-nodal mesh interconnect.

10. The apparatus of claim 8, wherein a portion of the augmented graph comprises an intra-nodal chain.

11. The apparatus of claim 8, wherein computing the flow schedule comprises using a mixed-integer linear program.

12. The apparatus of claim 8, wherein the flow schedule comprises program instructions.

13. The apparatus of claim 8, wherein computing the flow schedule comprises using a minimum delay path algorithm.

14. The apparatus of claim 8, wherein the processor is configured to assign a plurality of slots that are associated with a transmission cycle for the flow.

15. A data traffic scheduling method comprising:
    obtaining, using a network controller, a network topology for a network;
    generating, using the network controller, an augmented graph based on the network topology, wherein the augmented graph comprises configuration representing a network node, the configuration comprises a first plurality of ingress slots of the network node corresponding to an ingress link of the network node, a second plurality of egress slots of the network node corresponding to an egress link of the network node, and a third plurality of logical links of the network node, a first number of the first plurality of ingress slots is based on a first data rate of the ingress link of the network node, a second number of the second plurality of egress slots is based on a second data rate of the egress link of the network node, each of the ingress slots is connected to each of the egress slots, and each of the logical links represents a link propagation delay between one of the ingress slots and one of the egress slots;

converting, using the network controller, the augmented graph to a mixed-integer linear program;

scheduling, using the network controller, a flow in the network using the mixed-integer linear program to minimize delay or delay variance of the flow; and outputting, using the network controller, a flow schedule to the network node in order to program the network node for implementation of the flow schedule.

16. The method of claim 15, wherein a portion of the augmented graph comprises an intra-nodal mesh interconnect.

17. The method of claim 15, wherein a portion of the augmented graph comprises an intra-nodal chain.

18. The method of claim 15, wherein scheduling the flow comprises assigning a plurality of slots that are associated with a transmission cycle for the flow.

19. The method of claim 1, wherein each of the logical links represents a link propagation delay in changing from a corresponding ingress slot to a corresponding egress slots of the network node.

20. The method of claim 1, wherein the determining the flow schedule comprises determining the flow schedule for the new flow that minimizes delay variances of the plurality of flows based on the augmented graph as updated.

21. The method of claim 1, wherein a first number of the first plurality of ingress slots is proportional to a first data rate of the ingress link of the network node, a second number of the second plurality of egress slots is proportional to a second data rate of the egress link of the network node, and the logical links connect each of the first plurality of ingress slots to each of the second plurality of egress slots.

* * * * *